(12) United States Patent
Lee

(10) Patent No.: US 6,260,918 B1
(45) Date of Patent: Jul. 17, 2001

(54) BICYCLE SADDLE

(76) Inventor: Daniel Lee, No. 323, Chung-Hua Rd., Nantou City (TW)

( * ) Notice: Subject to any disclaimer, the term of this patent is extended or adjusted under 35 U.S.C. 154(b) by 0 days.

(21) Appl. No.: 09/615,194

(22) Filed: Jul. 13, 2000

(51) Int. Cl.[7] ..................................................... B60N 2/38
(52) U.S. Cl. ........................................ 297/195.1; 297/211
(58) Field of Search ............................. 297/195.1, 199, 297/200, 211, 208, 209, 215.16; 267/132

(56) References Cited

U.S. PATENT DOCUMENTS 5,775,710 * 7/1998 Yu .
5,855,410 * 1/1999 Lin .
6,007,148 * 12/1999 Yu .

* cited by examiner

Primary Examiner—Milton Nelson, Jr.

(74) Attorney, Agent, or Firm—Townsend and Townsend and Crew LLP

(57) ABSTRACT

A bicycle saddle includes a seat body made of a rigid plastic material, and including forward and rear portions. Two mounting poles have upper ends secured to the rear portion, and lower ends extending downwardly of the upper ends and having threaded portions. A retaining member has two major walls, and two through holes formed through the major walls for passage of the mounting poles, respectively. A supporting member engages the forward portion, and is connected to the retaining member. At least one pair of first and second deformable members are disposed between the seat body and the retaining member. Each deformable member has two abutting walls, an annular inner periphery extending to communicate the abutting walls to define a penetrating hole therein for sleeving snugly on the respective mounting pole, and two annular recess portions extending radially from the abutting walls to be communicated with the penetrating hole, and inwardly toward each other. Two fastening members are disposed to engage threadedly and respectively the threaded portions to secure the retaining member to the seat body.

5 Claims, 5 Drawing Sheets

BICYCLE SADDLE

BACKGROUND OF THE INVENTION

1. Field of the Invention

This invention relates to a bicycle saddle, more particularly to a bicycle saddle with at least two deformable members mounted on an underside of a seat body for absorbing shock and vibration applied on the seat body.

2. Description of the Related Art

Referring to FIG. 1, a conventional bicycle saddle is shown to include a seat body 1 which has an engaging member 2 at a front end for engaging a front end 4a of a supporting bracket 4, and two mounting poles 3 at a rear end and passing through holes 5a in a retaining plate 5. The supporting bracket 4 is connected to the retaining plate 5. Two vibration springs 6 are sleeved on the mounting poles 3, and engage securely the holes 5a in the retaining plate 5 in such a manner that screw fasteners 7 engage threadedly the mounting poles 3 so as to enable the vibration springs 6 to absorb the shock and vibration applied on the seat body 1. However, since the vibration springs 6 are made of metal, they are heavy and increase the weight of the bicycle. In addition, the assembly of the vibration springs 6 on the seat body 1 is inconvenient to conduct.

SUMMARY OF THE INVENTION

The object of the present invention is to provide a bicycle saddle which is relatively light and which is convenient to assemble.

According to this invention, the bicycle saddle includes a seat body made of a rigid plastic material, and including forward and rear portions opposite to each other in a longitudinal direction. The seat body has an upper wall with a contour adapted for seating of a user, an underside wall opposite to the upper wall in a first transverse direction, and two mounting poles. Each mounting pole has an upper end secured to the rear portion of the seat body, and a lower end extending downwardly of the upper end and having a threaded portion. The mounting poles are spaced apart from each other in a second transverse direction transverse to both the longitudinal direction and the first transverse direction. A retaining member has two major walls opposite to each other in the first transverse direction, and two through holes formed through the major walls for passage of the mounting poles, respectively. A supporting member has a front end engaging the forward portion beneath the underside wall, and two bracing bars extending rearwardly of the front end and connected to the retaining member. At least one pair of first and second deformable members is disposed between the underside wall and the retaining member. Each deformable member has two abutting walls which are disposed opposite to each other in the first transverse direction, and an annular inner periphery which extends in the first transverse direction and which intercommunicates the abutting walls to define a penetrating hole therein for sleeving snugly on a respective one of the mounting poles. Each abutting wall has an annular outer portion and an annular inner portion respectively distal and proximate to the annular inner periphery. Each deformable member further has two annular recess portions which extend radially from the annular inner portions adjacent to the annular outer portion to be communicated with the penetrating hole, and inwardly in the first transverse direction toward each other. Two fastening members are disposed to engage threadedly and respectively the threaded portions to secure the retaining member to the seat body.

BRIEF DESCRIPTION OF THE DRAWINGS

Other features and advantages of the present invention will become apparent in the following detailed description of the preferred embodiments of the invention, with reference to the accompanying drawings, in which:

Referring to FIGS. 2 and 3, the first preferred embodiment of the bicycle saddle according to the present invention is shown to comprise a seat body 10 which is made of a rigid plastic material, and which includes forward and rear portions 11,12 opposite to each other in a longitudinal direction. The seat body 10 has an upper wall 15 with a contour adapted for seating comfort of a user, an underside wall 16 opposite to the upper wall 15 in a first transverse direction, and two mounting poles 121. The mounting poles 121 have upper ends secured to the rear portion 12, and lower ends extending downwardly of the upper ends in the first transverse direction and respectively having two threaded portions 1211. The mounting poles 121 are spaced apart from each other in a second transverse direction transverse to both the longitudinal direction and the first transverse direction.

A retaining member 33 has two major walls 332 opposite to each other in the first transverse direction, and two through holes 331 formed through the major walls 332 and disposed opposite to each other in the second transverse direction for passage of the mounting poles 121, respectively.

Figure 1:
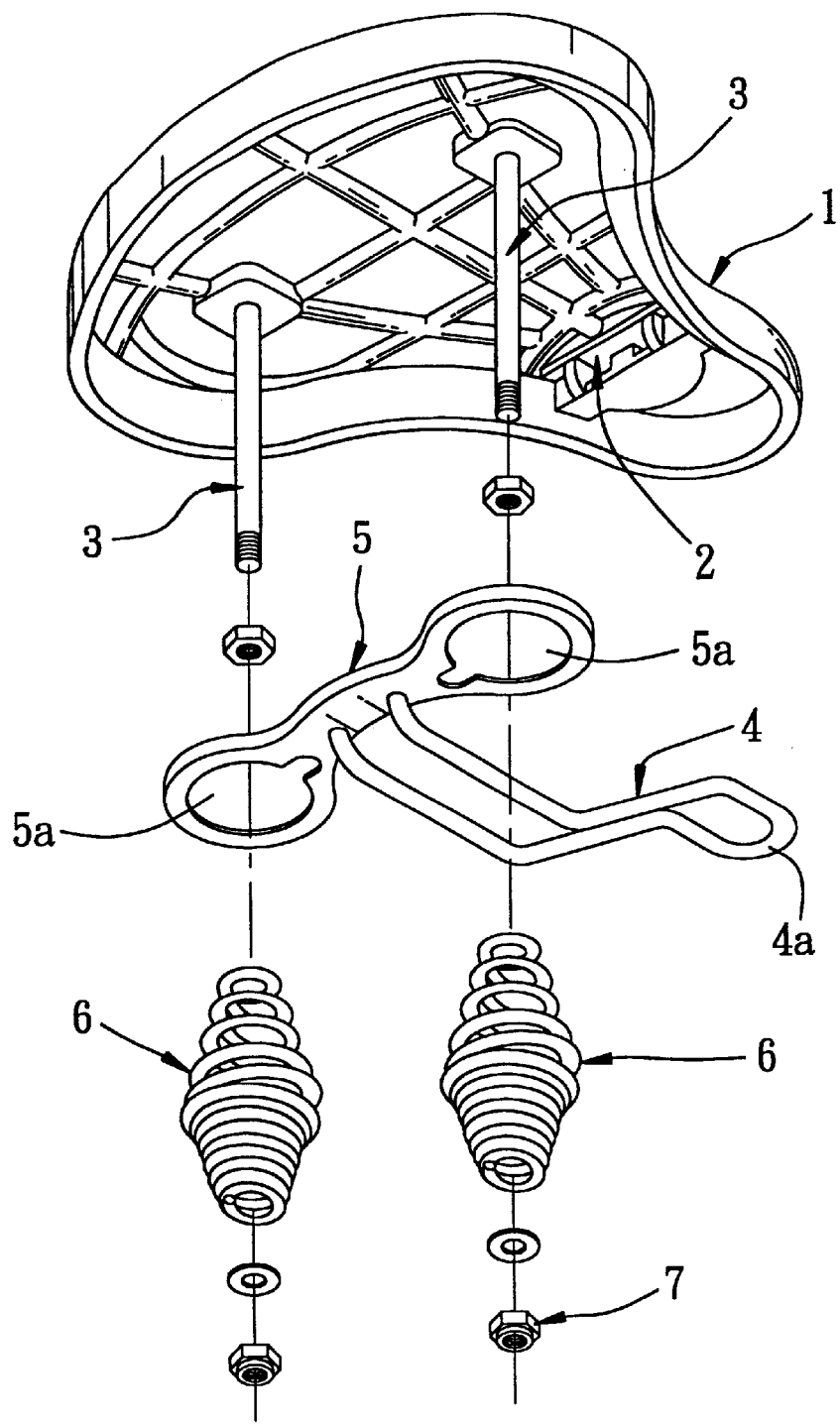
FIG. 1 is an exploded perspective view of a conventional bicycle saddle.
Figure 2:
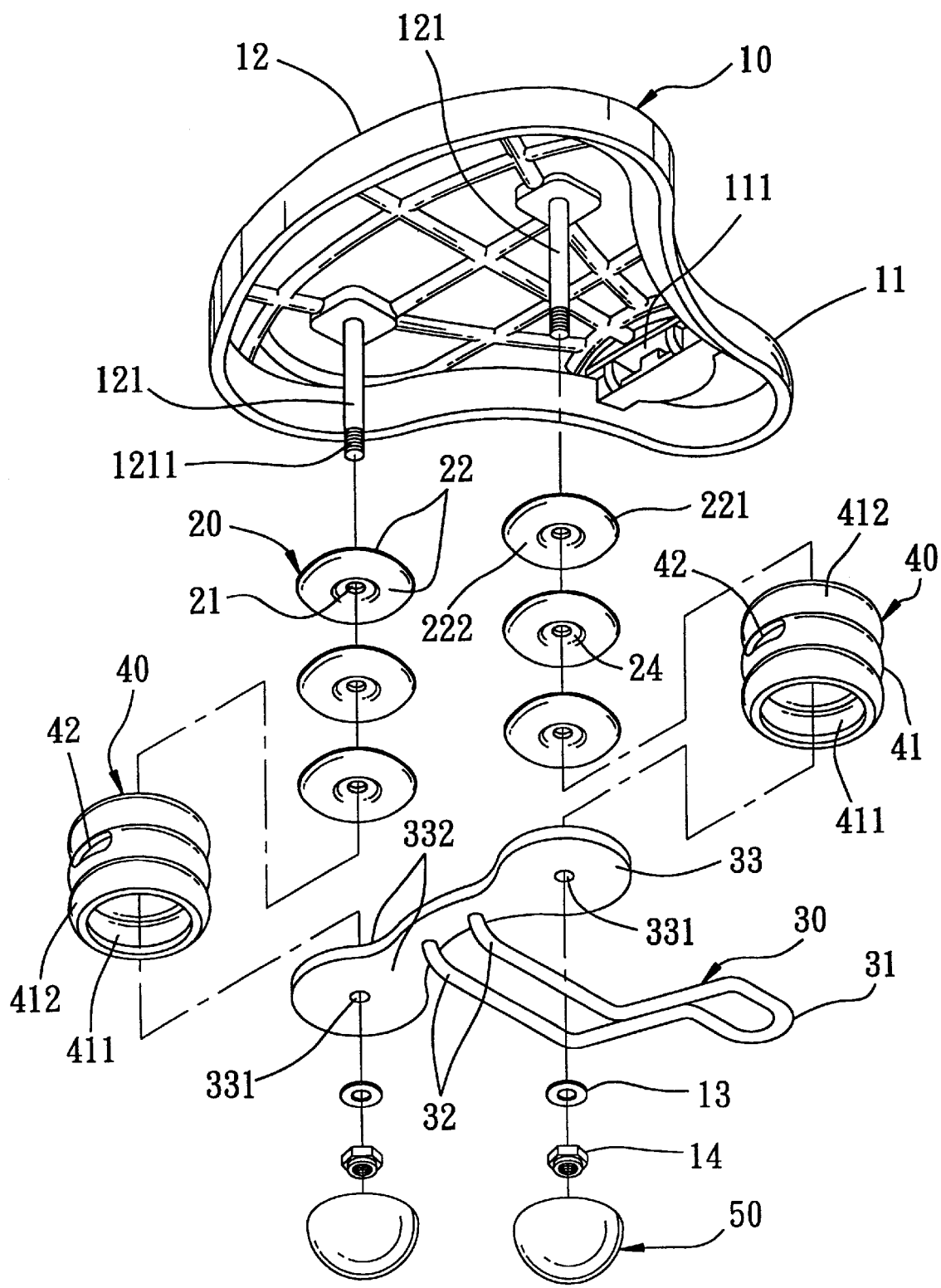
FIG. 2 is an exploded perspective view of a first preferred embodiment of a bicycle saddle according to this invention.
Figure 3:
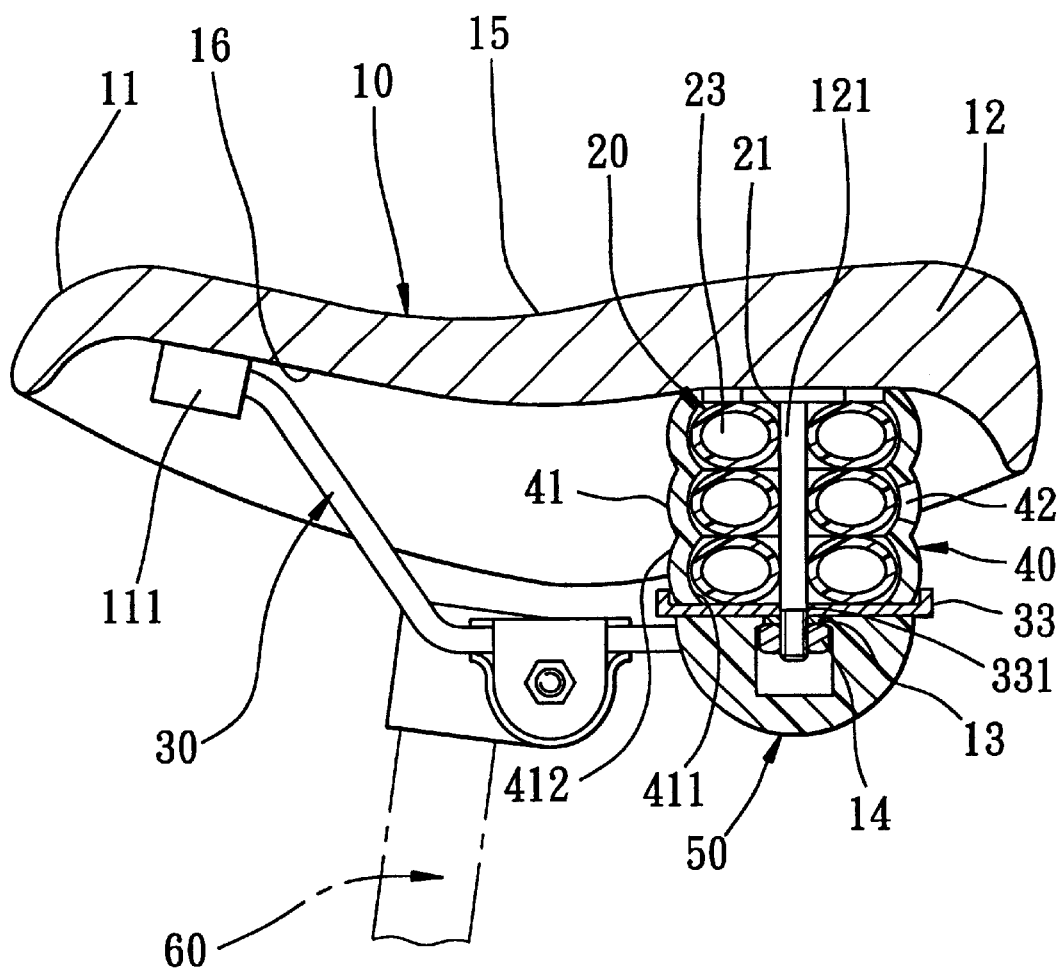
FIG. 3 is a sectional view of the first preferred embodiment.

A supporting member 30 has a front end 31 which is inserted into an engaging portion 11 of the forward portion 11 beneath the underside wall 16, and two bracing bars 32 which extend rearwardly of the front end 31 in the longitudinal direction and which are connected to the retaining member 33. As shown in FIG. 3, the bracing bars 32 are supported by a supporting post 60 of a bicycle frame (not shown).

Three pairs of first and second deformable members 20 are disposed between the underside wall 16 and the retaining member 33. The first deformable members 20 are superimposed upon each other in the first transverse direction. The second deformable members 20 are superimposed upon each other in the first transverse direction. Each of the first and second deformable members 20 is made of a reinforced plastic material, and has two abutting walls 22 which are disposed opposite to each other in the first transverse direction, an annular inner periphery which extends in the first transverse direction and which intercommunicates the abutting walls 22 to define a penetrating hole 21 therein for sleeving snugly on the respective mounting pole 121, and an annular air chamber 23 which is formed between the abutting walls 22 and which surrounds the annular inner periphery for receiving air therein. Each abutting wall 22 has an annular outer portion 221 and an annular inner portion 222 respectively distal and proximate to the annular inner periphery. In addition, each deformable member 20 further has two annular recess portions 24 which extend radially from the annular inner portions 222 of the abutting walls 22 adjacent to the annular outer portion 221, towards the penetrating hole 21 to be communicated with the penetrating hole 21, and inwardly in the first transverse direction toward each other.

Two fastening members include two screw nuts 14 and two washers 13, and engage threadedly and respectively the threaded portions 1211 to secure the retaining member 33 to the seat body 10. Two flexible annular protective members 40 are sleeved on the first and second deformable members 20, respectively. Each annular protective member 40 includes three annular surrounding walls 41 which are joined with and which are superimposed upon one another in the first transverse direction. Each annular surrounding wall 41 includes an annular inner peripheral wall portion 411 and an annular outer peripheral wall portion 412 which is disposed concentrically opposite to the inner peripheral wall portion 411 about an axis parallel to the first transverse direction. The outer peripheral wall portion 412 of the middle surrounding wall 41 has a viewing hole 42 which extends in a radial direction to the inner peripheral wall portion 411 to permit viewing of corresponding ones of the first and second deformable members 20.

A pair of covering members 50 are mounted on the major wall 332 of the retaining member 33, and engage the fastening members, respectively so as to conceal the latter.

Figure 4:
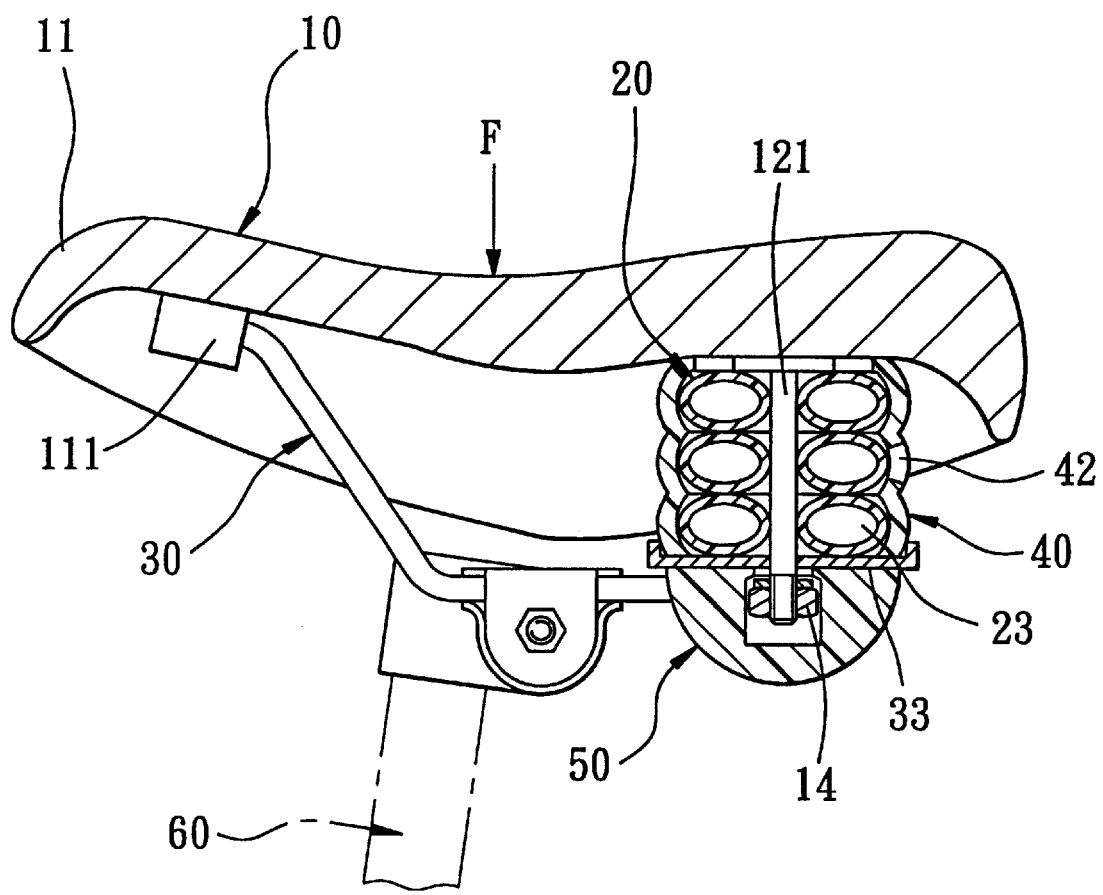
FIG. 4 is a sectional view of the first preferred embodiment in a state of use.

Referring to FIG. 4, during use, when a force (F) is applied on the seat body 10, the deformable members 20 can deform in any direction easily, thereby providing the bicycle saddle with an enhanced shock-absorbing capability. In addition, the deformable members 20, which are made of reinforced plastic material, are much lighter than the vibration springs of the conventional bicycle saddle, and can be mounted on the seat body 10 conveniently.

Figure 5:
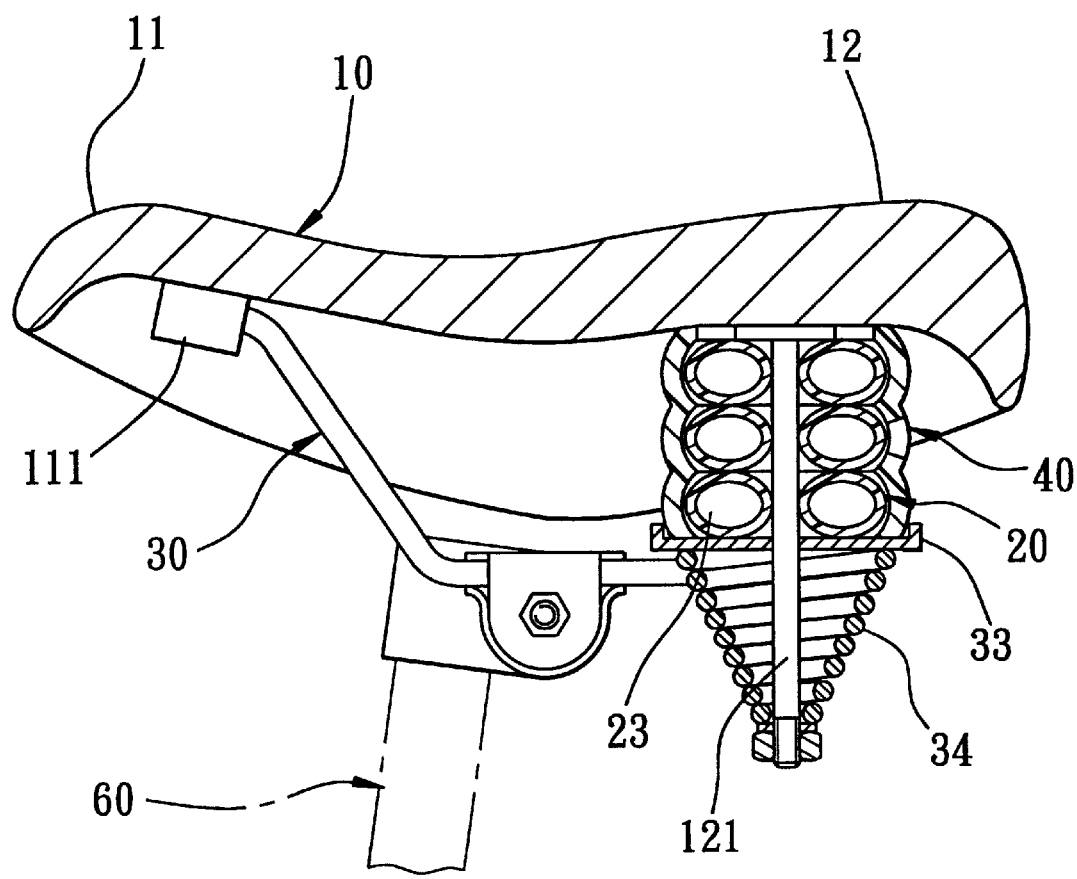
FIG. 5 is a sectional view of a second preferred embodiment of the bicycle saddle according to this invention.

FIG. 5 shows the second preferred embodiment of the bicycle saddle according to this invention. In addition to the components of the first preferred embodiment, the bicycle saddle includes two spring members 34 which are disposed beneath the major wall 332 of the retaining member 33 and which are sleeved and secured respectively on the mounting poles 121 when the fastening members 13,14 engage threadedly and respectively the threaded portions 1211, thereby increasing the shock-absorbing effect.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A bicycle saddle comprising:
    a seat body made of a rigid plastic material, and including forward and rear portions opposite to each other in a longitudinal direction, said seat body having an upper wall with a contour adapted for seating of a user, an underside wall opposite to said upper wall in a first transverse direction, and two mounting poles having upper ends secured to said rear portion and lower ends extending downwardly of said upper ends in the first transverse direction and respectively having two threaded portions, said mounting poles being spaced apart from each other in a second transverse direction transverse to both the longitudinal direction and the first transverse direction;
    a retaining member having two major walls opposite to each other in the first transverse direction, and two through holes formed through said major walls and disposed opposite to each other in the second transverse direction for passage of said mounting poles, respectively;
    a supporting member having a front end engaging said forward portion beneath said underside wall, and two bracing bars extending rearwardly of said front end in the longitudinal direction and connected to said retaining member;
    at least one pair of first and second deformable members made of a reinforced plastic material and disposed between said underside wall and said retaining member, each of said first and second deformable members having two abutting walls which are disposed opposite to each other in the first transverse direction, a surrounding inner periphery which extends in the first transverse direction and which intercommunicates said abutting walls to define a penetrating hole therein for sleeving snugly on a respective one of said mounting poles, and a surrounding air chamber formed between said abutting walls and surrounding said surrounding inner periphery for receiving air therein, each of said abutting walls having a surrounding outer portion and a surrounding inner portion respectively distal and proximate to said surrounding inner periphery, each of said deformable members further having two surrounding recess portions which extend radially from said surrounding inner portion adjacent to said surrounding outer portion towards said penetrating hole to be communicated with said penetrating hole, and inwardly in the first transverse direction toward each other; and
    two fastening members disposed to engage threadedly and respectively said threaded portions to secure said retaining member to said seat body.

2. The bicycle saddle as claimed in claim 1, further comprising two spring members which are disposed beneath one of said major walls of said retaining member and which are sleeved and secured respectively on said mounting poles when said fastening members engage threadedly and respectively said threaded portions.

3. The bicycle saddle as claimed in claim 1, wherein said at least one pair of said first and second deformable members are three pairs of said first and second deformable members, said first deformable members being superimposed upon each other in the first transverse direction, said second deformable members being superimposed upon each other in the first transverse direction.

4. The bicycle saddle as claimed in claim 1, further comprising two surrounding protective members sleeved on said first and second deformable members, respectively.

5. The bicycle saddle as claimed in claim 4, wherein each of said surrounding protective members has a surrounding inner peripheral wall portion, and a surrounding outer peripheral wall portion disposed concentrically opposite to said surrounding inner peripheral wall portion about an axis parallel to the first transverse direction, and having a viewing hole extending in a radial direction to said surrounding inner peripheral wall portion to permit viewing of corresponding ones; at said first and second deformable members.

* * * * *